United States Patent
Wang et al.

(10) Patent No.: US 11,190,628 B2
(45) Date of Patent: Nov. 30, 2021

(54) HIGH-SPEED DATA-PLANE PACKET AGGREGATION AND DISAGGREGATION METHOD

(71) Applicant: NATIONAL CHIAO TUNG UNIVERSITY, Hsinchu (TW)

(72) Inventors: Shie-Yuan Wang, Hsinchu (TW); Chia-Ming Wu, Yunlin County (TW); Yi-Bing Lin, Hsinchu County (TW); Jun-Yi Li, Kaohsiung (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 16/374,071

(22) Filed: Apr. 3, 2019

(65) Prior Publication Data
US 2020/0322465 A1 Oct. 8, 2020

(51) Int. Cl.
*H04L 29/08* (2006.01)
*H04L 29/06* (2006.01)

(52) U.S. Cl.
CPC ............ *H04L 69/324* (2013.01); *H04L 69/22* (2013.01); *H04L 67/12* (2013.01)

(58) Field of Classification Search
None
See application file for complete search history.

(56) References Cited

U.S. PATENT DOCUMENTS

| 8,228,954 | B2* | 7/2012 | Thubert | H04W 40/246 370/503 |
| 9,891,898 | B1* | 2/2018 | Tonsing | G06F 8/31 |
| 10,164,829 | B1* | 12/2018 | Watson | H04L 49/90 |
| 10,230,810 | B1* | 3/2019 | Bhide | H04L 67/2842 |
| 10,454,833 | B1* | 10/2019 | Bosshart | H04L 45/16 |
| 2011/0271008 | A1* | 11/2011 | An | H04L 69/16 709/242 |
| 2013/0195017 | A1* | 8/2013 | Jamadagni | H04W 28/065 370/328 |
| 2015/0207905 | A1* | 7/2015 | Merchant | H04L 69/22 370/390 |
| 2016/0139892 | A1* | 5/2016 | Atreya | G06F 8/71 717/143 |
| 2016/0149784 | A1* | 5/2016 | Zhang | H04B 17/00 370/229 |

(Continued)

OTHER PUBLICATIONS

Bosshart et al. P4: Programming Protocol-Independent Packet Processors—2014.*

(Continued)

*Primary Examiner* — Christopher T Wyllie
(74) *Attorney, Agent, or Firm* — Muncy, Geissler, Olds & Lowe, PC

(57) ABSTRACT

A high-speed data-plane packet aggregation and disaggregation method is disclosed. The method includes following steps: receiving a plurality of packets by the P4 switch; parsing each of the plurality of packets by using a parse graph; determining the type of the packets by using a match-action table; conducting packet aggregation and disaggregation process at the pipeline of the P4 switch; and transmitting the aggregated packet or the original data packet to a deparser of the P4 switch and outputting the aggregated packet or the original data packet by the P4 switch.

10 Claims, 9 Drawing Sheets

(56) References Cited

U.S. PATENT DOCUMENTS

| | | | |
|---|---|---|---|
| 2016/0197852 A1* | 7/2016 | Hutchison | H04L 45/74 370/392 |
| 2018/0124638 A1* | 5/2018 | Del Carpio Vega | H04L 69/04 |
| 2018/0191631 A1* | 7/2018 | Biederman | H04L 67/2842 |
| 2018/0262599 A1* | 9/2018 | Firestone | G06F 9/45558 |
| 2019/0044994 A1* | 2/2019 | Sarangam | H04L 69/04 |
| 2019/0268241 A1* | 8/2019 | Bifulco | H04L 47/125 |
| 2019/0394308 A1* | 12/2019 | Balasubramanian | H04L 69/169 |

OTHER PUBLICATIONS

Yi-Bing Lin; Shie-Yuan Wang; Ching-Chun Huang; & Chia-Ming Wu. "The SDN Approach for the Aggregation/Disaggregation of Sensor Data," *Sensors*, Jun. 25, 2018, pp. 1-15, vol. 2018-18, 2025.

* cited by examiner

HIGH-SPEED DATA-PLANE PACKET AGGREGATION AND DISAGGREGATION METHOD

BACKGROUND OF THE INVENTION

1. Field of the Invention

The present disclosure generally relates to a high-speed data-plane packet aggregation and disaggregation method, and in particular, to the packet aggregation and disaggregation method to transmit data packets by using a Programming Protocol-Independent Packet Processor (P4) switch. In this disclosure, data packets may be called the "message packets".

2. Description of the Related Art

Due to the fast development of Internet of Things (IoT), it is forecast that in the future a huge number of IoT devices will be deployed in various environments for different IoT applications. One IoT application example is the smart water/gas/electricity metering, in which a huge number of smart meters periodically report their most recent usages back to the central office of these utility companies for billing or energy-saving purposes.

In such an IoT application, a huge number of smart meters (or IoT devices) periodically send their packets (includes sensing data or message) to the server or the cloud database so that the data carried in them can be intelligently processed, analyzed, and used. Because the usage data to be returned to the server are short, most of these IoT packets are also very short in size. For example, the prominent LPWAN (Low-Power WAN) technology (the Sigfox protocol) for supporting the IoT application provides only 12-byte payload for uplink message and 8-byte payload for downlink message. For the IoT devices using such the LPWAN technology, only small IoT packets can be generated and transmitted.

Relative to its total length, the packet headers of a small IoT packet occupy a very large portion of the total packet. As a result, when these small IoT packets are transmitted over a network, a very large percentage of network bandwidth is wasted on transmitting these headers. Packet aggregation can reduce such a percentage by sharing only one copy of the same packet headers among multiple aggregated packets. Packet aggregation is an effective mechanism to deliver small packets in networks.

However, the known technique of packet aggregation and disaggregation method has the limitation and shortcomings. Hence, the inventor provides the high-speed data-plane packet aggregation and disaggregation method to resolve the drawbacks so as to promote the industrial practicability.

SUMMARY OF THE INVENTION

In view of the aforementioned technical problems, one objective of the present disclosure provides a high-speed data-plane packet aggregation and disaggregation method, which is capable of conducting packet aggregation and disaggregation in the data-plane instead of executing the software program by CPU in the control-plane, so as to reduce the cost and improve the transmission efficiency.

In accordance with one objective of the present disclosure, a high-speed data-plane packet aggregation method for transmitting data packets by using a Programming Protocol-Independent Packet Processor (P4) switch is provided. The packet aggregation method includes the following steps of: receiving a plurality of packets by the P4 switch, the plurality of packets being transmitted to a parser of the P4 switch; parsing each of the plurality of packets to an Ethernet header, an IP header, a UDP header, a flag header and a message header by using a parse graph defined in a switch configuration of the P4 switch, the flag header indicating types of the plurality of packets and the message header representing data payload of the plurality of packets; checking the flag header of the plurality of packets to determine whether the plurality of packets are message packets by using a match-action table defined in the switch configuration of the P4 switch, the match-action table defines a plurality of match fields and a plurality of control actions corresponding to the plurality of match fields for conducting a control program at an ingress pipeline of the P4 switch; saving the message headers of the message packets in a memory space of the P4 switch by using a match-action table; aggregating a preset number of message headers as an aggregated header and modifying the IP header and the UDP header to generate an aggregated packet at an egress pipeline of the P4 switch by using the match-action table; and transmitting the aggregated packet to a deparser of the P4 switch and outputting the aggregated packet by the P4 switch.

Preferably, the message packets may include sensing data collected by an IoT device.

Preferably, the control actions of the match-action table may include get counter for counting numbers of the message packets received so far for generating the aggregated packet.

Preferably, the control actions of the match-action table may include save message for saving the message header in a message pool.

Preferably, the control actions of the match-action table may include move message for combining saved message headers to the aggregated header and update length for modifying checksums of the IP header and the UDP header.

In accordance with another objective of the present disclosure, high-speed data-plane packet disaggregation method for transmitting data packets by using a Programming Protocol-Independent Packet Processor (P4) switch is disclosed. The packet disaggregation method includes the following steps of: receiving a plurality of packets by the P4 switch, the plurality of packets being transmitted to a parser of the P4 switch; parsing each of the plurality of packets to an Ethernet header, an IP header, a UDP header, a flag header and an aggregated header by using a parse graph defined in a switch configuration of the P4 switch, the flag header indicating types of the plurality of packets and the aggregated header representing data payload of the plurality of packets; checking the flag header of the plurality of packets to determine whether the plurality of packets are aggregated packets by using a match-action table defined in the switch configuration of the P4 switch, the match-action table defines a plurality of match fields and a plurality of control actions corresponding to the plurality of match fields for conducting a control program at an ingress pipeline of the P4 switch; cloning the aggregated packet and saving a cloned packet in a memory space of the P4 switch by using a match-action table; modifying the aggregated header of the cloned packet to generate an original message header and modifying the IP header and the UDP header of the cloned packet to generate an original message packet at an egress pipeline of the P4 switch by using the match-action table;

and transmitting the original message packet to a deparser of the P4 switch and outputting the original message packet by the P4 switch.

Preferably, the original message packet may be output from the P4 switch and transmitted to an IoT server.

Preferably, the high-speed data-plane packet disaggregation method may further include the following step of: sending the cloned packet to the egress pipeline and saving message headers divided in the aggregated header of the cloned packet in the egress pipeline according to a preset number; adding a new message header to the cloned packet and removing the aggregated header to generate the original message packet; and setting a recirculate flag to indicate that the aggregated packet needs to be recirculated back to the parser to perform another cloning process until a number of a clone operation equals the preset number.

Preferably, the high-speed data-plane packet disaggregation method may further include the following step of: sending the cloned packet to the egress pipeline; adding a new message header and moving a divided message header in the aggregated header of the cloned packet to the new message header as the original message header and removing the aggregated header of the cloned packet to generate the original message packet; and setting a counter to represent a number of a clone operation applied to the aggregated packet and resubmit the aggregated packet back to the parser to perform another cloning process until the number meets a preset disaggregated number.

Preferably, the control actions of the match-action table may include set multicast for generating a preset number of copies of the aggregated packet and each of the preset number of copies leaves a desired message in the aggregated header by removing all of other messages in the aggregated header, and then defining same output port for the preset number of copies.

As mentioned previously, the high-speed data-plane packet aggregation and disaggregation method in accordance with the present disclosure may have one or more advantages as follows.

1. The high-speed data-plane packet aggregation and disaggregation method is capable to combine the small IoT message packets into a larger aggregated packet by sharing the same headers occupied in the packet, so as to reduce the percentage of network bandwidth wasted on transmitting such headers.

2. The high-speed data-plane packet aggregation and disaggregation method may conduct the packet aggregation and disaggregation in the data-plane of the switch, which avoids using the CPU (central processing unit) to execute the software program and provides the high-speed transmitting rate.

3. The high-speed data-plane packet aggregation and disaggregation method may use the P4 switch to conduct the present method without adding additional hardware device, so as to provide the packet aggregation and disaggregation with low cost.

DETAILED DESCRIPTION OF THE PREFERRED EMBODIMENTS

In order to facilitate the understanding of the technical features, the contents and the advantages of the present disclosure, and the effectiveness thereof that can be achieved, the present disclosure will be illustrated in detail below through embodiments with reference to the accompanying drawings. On the other hand, the diagrams used herein are merely intended to be schematic and auxiliary to the specification, but are not necessary to be true scale and precise configuration after implementing the present disclosure. Thus, it should not be interpreted in accordance with the scale and the configuration of the accompanying drawings to limit the scope of the present disclosure on the practical implementation.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Figure 1:
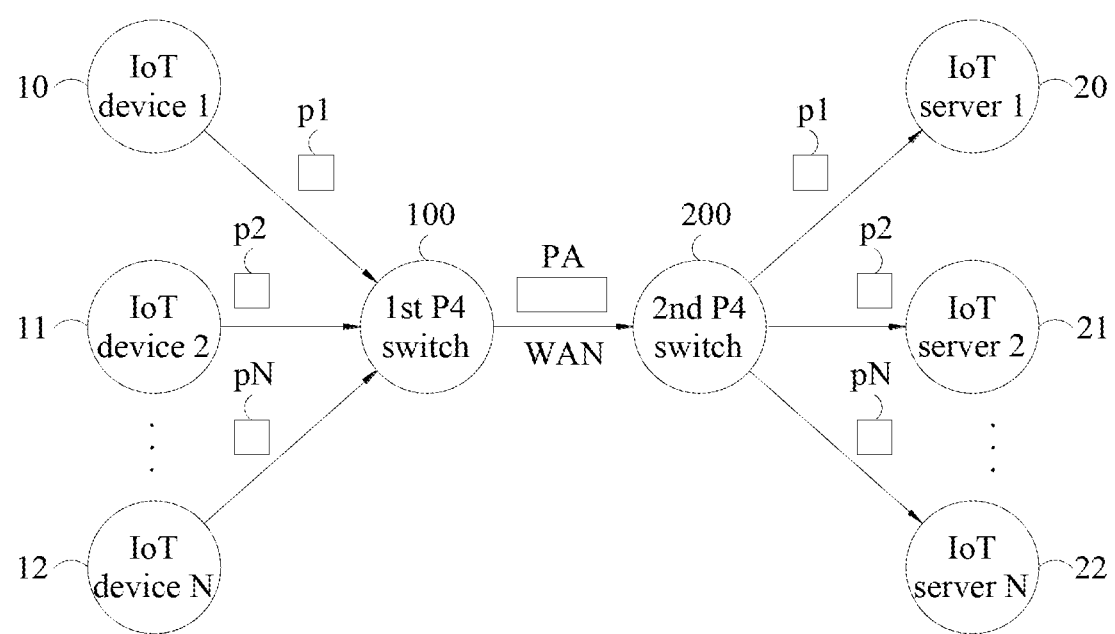
FIG. 1 is a schematic diagram illustrating the network architecture of packet aggregation and disaggregation in accordance with the present disclosure.

FIG. 1 is a schematic diagram illustrating the network architecture of packet aggregation and disaggregation in accordance with the present disclosure. As shown in the figure, the IoT (Internet of Thing) devices include a first IoT device 10, a second IoT device 11 . . . and the N-th IoT device 12. These IoT devices may be a smart television, an air conditioner, a refrigerator, and so on, which include sensors to collect the data of the devices or the environment. Such data are transmitted by message packets and sent to the IoT servers through the wide area network (WAN). The IoT servers may also include a first IoT server 20, a second IoT server 21 . . . and the N-th IoT server 22. In the present embodiment, one IoT server corresponds to one IoT device. However, the present disclosure is not limited in such setting. The IoT servers may be one or more data collectors corresponding to each IoT device, or may be a cloud database with multiple transmitting ports for receiving the message packets and saving the sensing data.

During the transmitting, the consecutive message packets p1, p2 . . . pN arrive at the 1st Programming Protocol-Independent Packet Processor (P4) switch 100. The first P4 switch 100 conducts the packet aggregation process to aggregate the small message packets p1, p2 . . . pN into a larger aggregated packet pA. The aggregated packet pA is sent over the WAN and will pass through the second P4 switch 200 before reaching the IoT servers. The second P4 switch 200 then disaggregates the aggregated packet pA into the original message packets p1, p2 . . . pN and forwards them towards the IoT servers. The aggregated packet pA is a valid IP packet and can traverse multiple switches and routers. The aggregated packet pA combines many small message packers as a larger packet. The reason of performing the packet aggregation is illustrated in FIG. 2.

Figure 2:
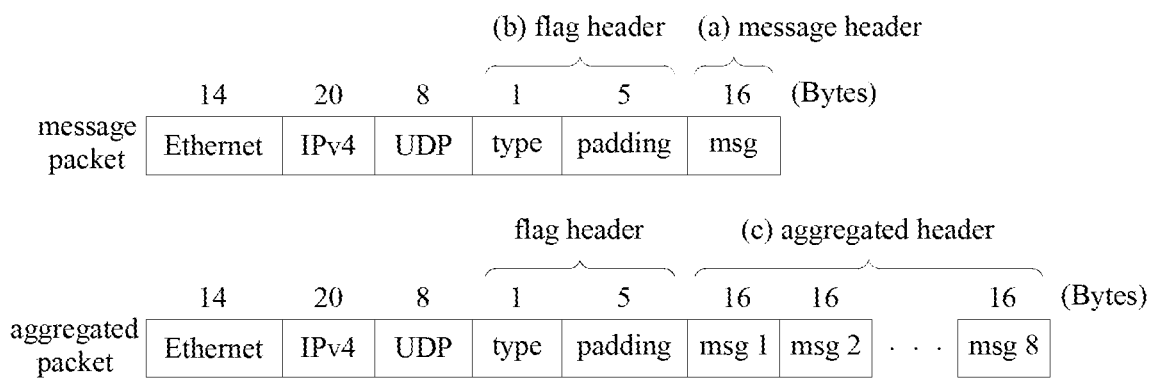
FIG. 2 is a schematic diagram of message packet and aggregated packet in accordance with the present disclosure.

Please refer to FIG. 2, which is a schematic diagram of message packet and aggregated packet in accordance with the present disclosure. As shown in the figure, the IoT message packet includes Ethernet header, IP header, UDP header, flag header (b) and message header (a). The aggregated packet also includes Ethernet header, IP header, UDP header and flag header (b). The multiple message headers (a) can be combined as an aggregated header (c). In the present embodiment the aggregated number can be 8. That is, eight message packets are aggregated as one aggregated packet. However, the aggregated number is not limited in the present embodiment. In addition, the minimum length of an Ethernet frame is 64 bytes and the flag header has a 40-bit "padding" field. To meet this requirement, the present embodiment make the length of the flag header to be 6 bytes so that together with a 14-byte Ethernet header, a 20-byte IP header, an 8-byte UDP header, and a 16-byte message, the total length of an IoT message packet is 64 bytes. The IP header, the UDP header and the flag header are the protocol to describe the packet information, packet type, output port and so on. The message header represents the sensing data or the message carried in the message packet. The reason of treating the payload of a packet as a header is because the P4 switch can only manipulate the headers parsed from a packet. The P4 switch needs to manipulate the packet payloads to aggregate or disaggregate them, so the approach took in the present embodiment is to view the packet payloads as headers.

Based on above packet formats, the message header only occupies 16 bytes and the rest of the other headers combined occupies 48 bytes. In other words, when transmitting one IoT message packet, a very large percentage of network bandwidth is wasted on transmitting these headers. Packet aggregation can reduce such a percentage by sharing only one copy of the same packet headers among multiple aggregated message packets. The reduction of packet header overhead made by packet aggregation can be very significant when the payload size is small. For example, when the packet aggregation is not performed, under the 16-byte payload size usages in the uplink of the Sigfox protocol, the 42-byte header overhead (which includes the 14-byte Ethernet header plus the 20-byte IP header plus the 8-byte UDP header) causes a percentage of 42/(42+16)=72%. When the packet aggregation is performed, the same 42-byte header overhead of the aggregated packet only causes a percentage of 42/(42+16*8)=25%. Accordingly, the transmitting efficiency can be significantly improved.

Although the packet aggregation and disaggregation have such effects to the data transmission, the conventional approaches use a server CPU or a switch CPU to execute software programs to perform these operations in the control-plane, which results in low throughputs. By programming the data-plane pipelines of a hardware P4 switch, the present disclosure implements packet aggregation and disaggregation purely in the pipelines of a switching ASIC. As a result, the packet aggregation throughput achieves the 100 Gbps line rate of the used P4 switch, which is the highest packet aggregation throughput. The detailed aggregation process will be illustrated by the following embodiment.

The following paragraphs will describe the process of the high-speed data-plane packet aggregation method for transmitting data packets by using a Programming Protocol-Independent Packet Processor (P4) switch.

Figure 3:
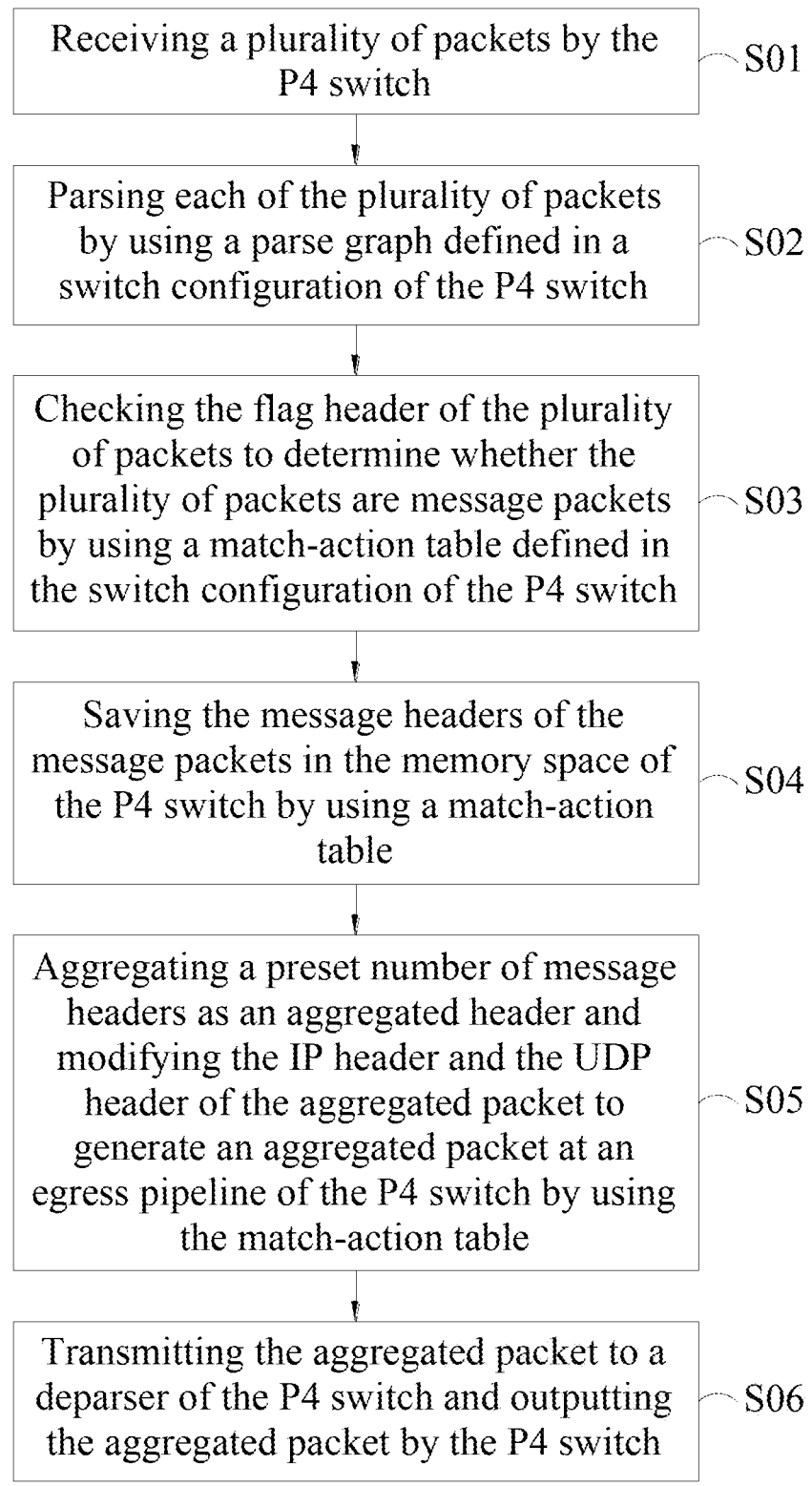
FIG. 3 is a flow chart of a high-speed data-plane packet aggregation method in accordance with the present disclosure.

FIG. 3 is a flow chart of a high-speed data-plane packet aggregation method in accordance with the present disclosure. As shown in the figure, the method includes the following steps (S01-S06).

Step S01: Receiving a plurality of packets by the P4 switch. As mentioned in the previous embodiment, the IoT device may collect the sensing data and the data is sent to the P4 switch by using the message packet. Since the IoT device is set to collect data in the preset time period, a plurality of data will be generated continuously. Thus, the plurality of message packets are sent to the input port of the P4 switch and then transmitted to a parser of the P4 switch.

Figure 4:
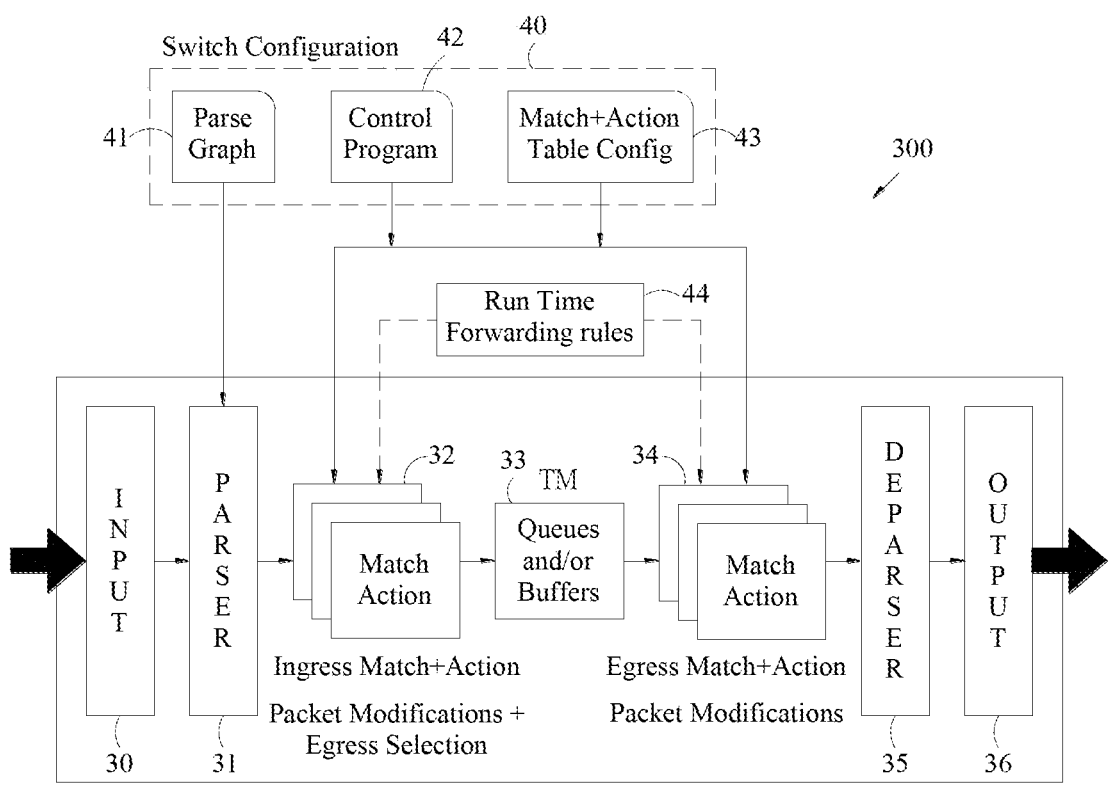
FIG. 4 is a schematic diagrams illustrating architecture of the P4 switch in accordance with the present disclosure.

Please refer to FIG. 4, which is the schematic diagrams illustrating the architecture of the P4 switch in accordance with the present disclosure. As shown in FIG. 4, the P4 switch 300 includes an input port 30, a parser 31, an ingress pipeline 32, a traffic manager 33, an egress pipeline 34, a deparser 35 and an output port 36. In addition to the above components, the P4 switch 300 further provides a switch configuration 40, which includes a parse graph 41, a control program 42 and a match-action table configuration 43. In the present embodiment, the input port 30 may connect to the IoT devices for receiving the message packets and the message packets are transmitted to the parser 31. The following steps are also illustrated with reference to the architecture of the P4 switch 300 recited in FIG. 4.

Step S02: Parsing each of the plurality of packets by using a parse graph defined in a switch configuration of the P4 switch. The parse graph 41 can be loaded to the switch configuration 40 of the P4 switch 300. The parse graph 41 defines the Ethernet header, the IP header, the UDP header, the flag header and the message header of the packet. The flag header indicates the types of the different packets and the message header represents the data payload of the packets. The parser 31 may parse the message packets into different headers by using the parse graph 41. As mentioned in the previous embodiment, the P4 switch 300 is able to operate the different headers. Thus, each field of the message packet is defined as the different headers. Based on the parsing result, not only the Ethernet header, the IP header and the UDP header can be operated to decide the output information, the contained message of the message packet can also be operated by being recognized as the message header.

Step S03: Checking the flag header of the plurality of packets to determine whether the plurality of packets are message packets by using a match-action table defined in the switch configuration of the P4 switch. The switch configuration 40 of the P4 switch 300 includes the control program 42 and the match-action table configuration 43. The control program 42 enables the defined headers to be moved and reorganized for conducting the packet aggregation or disaggregation. Such control program 42 and each operation steps can be compiled and defined with the match-action table configuration 43. The match-action table configuration 43 defines a plurality of match fields and a plurality of control actions corresponding to the plurality of match fields for conducting the control program 42 at the ingress pipeline 32 and egress pipeline 34 of the P4 switch 300. When the P4 switch 300 receives the message packet, the control program takes place in the hardware pipeline of the P4 switch 300. As a result, the message packet does not need to reach the control plane to be analyzed by the software run by the switch CPU. Based on this design, the performances of the packet aggregation or disaggregation can be improved dozens of times.

Back to the step, when the packets enter the ingress pipeline, the ingress pipeline 32 will check the flag header of the packet to determine whether the packet is a message packet. If the packet type indicates that the packet is a message packet, the following aggregation processes are continued. If the packet type indicates that the packet is an aggregated packet that contains several messages, the ingress pipeline 32 will conduct the disaggregation process, which will be illustrated at the following embodiment.

Step S04: Saving the message headers of the message packets in the memory space of the P4 switch by using a match-action table. When the message packets are determined as the message packets, the ingress pipeline 32 will save the message headers of each packet into the memory space of the P4 switch. The ingress pipeline 32 defines a preset number of message pools in the memory space to save the message headers sequentially. The ingress pipeline 32 also creates a counter to count the number of message packets that have entered the ingress pipeline 32 for the current aggregated packet to be generated. When the number reaches the preset number, the next step S05 will be performed.

Step S05: Aggregating a preset number of message headers as an aggregated header and modifying the IP header and the UDP header of the aggregated packet to generate an aggregated packet at an egress pipeline of the P4 switch by using the match-action table. When reaching the egress pipeline 34, the preset number of message headers are arranged sequentially to generate the aggregated header. The aggregated header is the new header that contains the data payload of each small message packet. Since the new header has a bigger size, the corresponding IP header and the UDP header need to make the appropriate changes. That is, the packet length and the checksum should be modified to form a valid aggregated packet for transmitting.

Step S06: Transmitting the aggregated packet to a deparser of the P4 switch and outputting the aggregated packet by the P4 switch. When the aggregated packet is generated, the packet will pass through the deparser 35 of the P4 switch 300 and output from the output port 36 of the P4 switch 300. The aggregated packet is transmitted to the IoT server or the cloud database through the WAN for deeper analysis.

Figure 5:
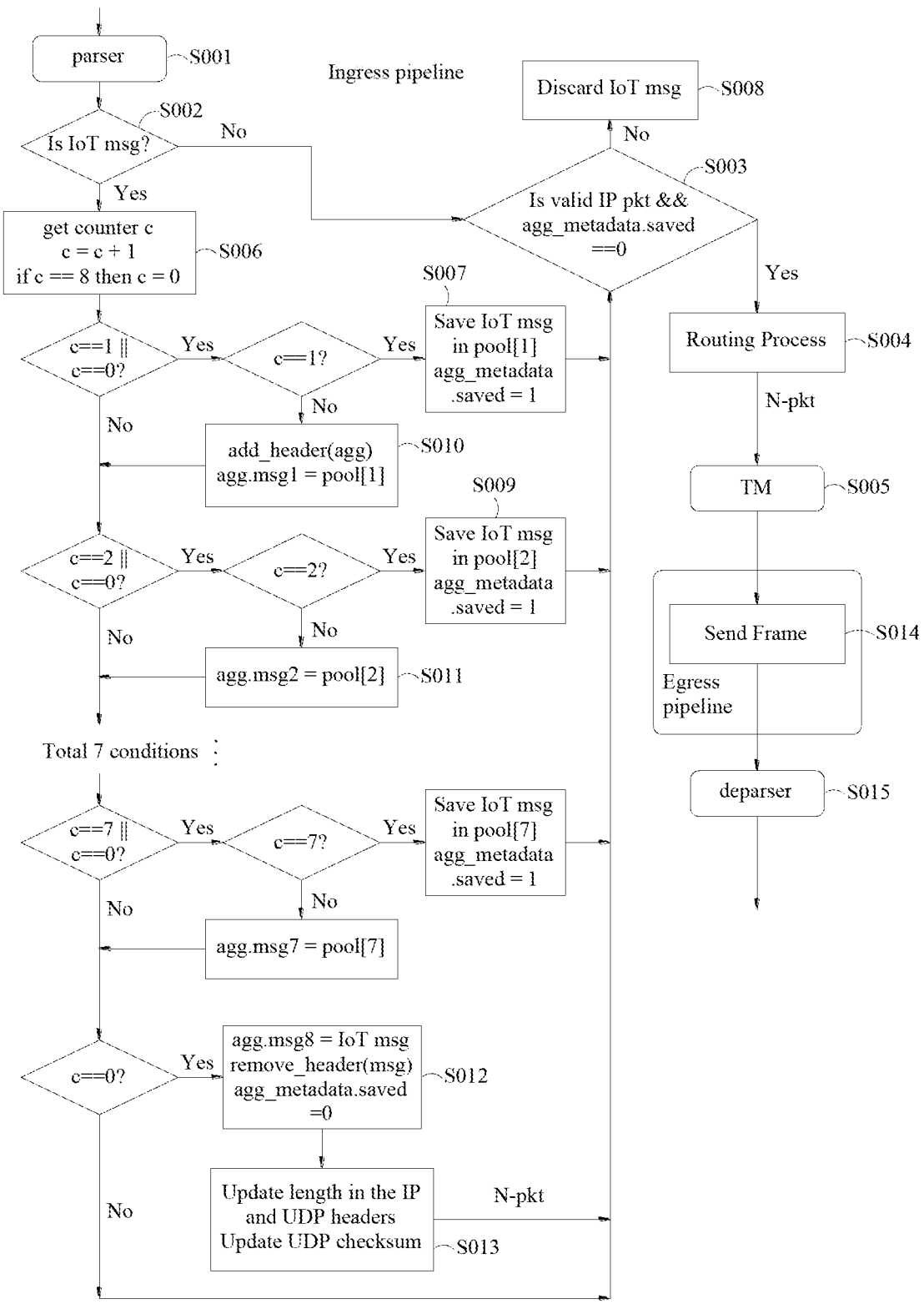
FIG. 5 is a flow chart of packet aggregation control program in accordance with the present disclosure.

Please also refer to FIG. 5, which is the flow chart of packet aggregation control program in accordance with the present disclosure. This flow chart is an example illustrating how to aggregate eight message packets into an aggregated packet. As shown in the figure, the detailed control program of the packet aggregation are provided. The flow chart includes several steps (S001-S015) of judging and operating the message packet. The present embodiment aggregates eight message packets into one aggregated packet, which is called the "N-packet" here. For this example, N=8. However, the aggregated number is not limited by eight of the present embodiment. The aggregated number may change according to the size of the carried information.

Figure 6:
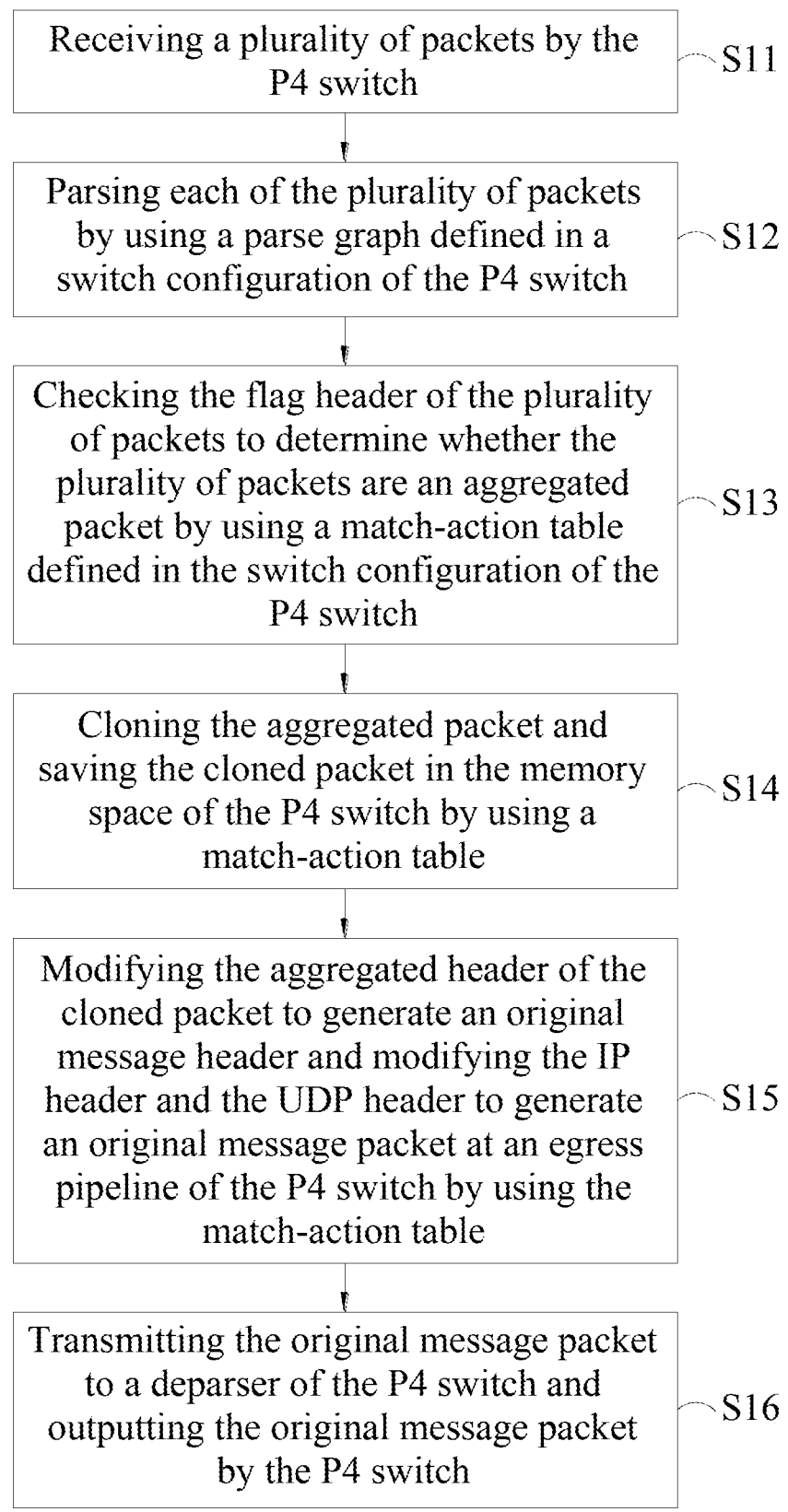
FIG. 6 is the flow chart of a high-speed data-plane packet disaggregation method in accordance with the present disclosure.

When the IoT packet arrives, as shown in step S001, the whole packet is parsed as multiple headers without any payload (i.e., the payload is extracted as a message header). The parser extracts the Ethernet, IP, UDP, flag, and message headers. When the flag header is encountered, the parser checks the value of the "type" field (step S002). Depending on the value, the parser extracts either the message header or the aggregated header from the payload of the packet. If the incoming packet is the message packet, it is aggregated as explained in the present embodiment. If the packet is the aggregated packet, then it is disaggregated as explained in the followed embodiment (FIGS. 6-8). Otherwise, the packet is sent to the routing process (step S004) for normal routing.

Step S002 checks if the incoming packet is an IoT packet (i.e., whether it has a valid message header). If so, the aggregation steps are executed by using a metadata called "agg_metadata", which has a "cnt" field and a "saved" field. The metadata is a register that is passed sequentially through the tables in the pipeline for information sharing among them. In the "agg_metadata", the "cnt" field is a 3-bit integer ranging between 0 and 7. Its value will be set when the packet passes the "getCounter" table. The "saved" field indicates if the packet being processed has been stored into the pool buffer. The IoT packets are aggregated with the following code, where the apply(TableName) statement specifies that the packet needs to pass through and be processed by the TableName table.

```
if(valid(msg)){
    apply(getCounter);
    apply(saveOrRetrieveMsg1);
    apply(saveOrRetrieveMsg2);
    apply(saveOrRetrieveMsg3);
    apply(saveOrRetrieveMsg4);
    apply(saveOrRetrieveMsg5);
    apply(saveOrRetrieveMsg6);
    apply(saveOrRetrieveMsg7);
    apply(moveMsgToMsg8);
}
```

With this code, the packet will sequentially pass through the getCounter table, 7 saveOrRetrieveMsg tables (note that these 7 tables are different tables with similar functions), and the moveMsgToMsg8 table. The action of the getCounter table reads the current value of the register "c," which counts the number of IoT packets that have been collected for aggregation so far. The initial value for the register "c" is 0 and the value will be increased by 1 before an IoT packet is aggregated (step S006). Because for the N=8 example this register only needs 3 bits, after counting up to 7, it will overflow and restart from 0.

When agg_metadata.cnt is passed through these tables, it is used as the only match field to match a specific entry in these tables. In the present embodiment, proper flow rules need to be pre-installed into these tables so that the agg_metadata.cnt of the packet can only be matched by a single entry in each table. Since an entry is associated with an action defined by the present embodiment, the different actions can be applied to the packet when it passes through these tables. This is the new aggregation design specific to the P4 "match-action" table architecture.

When the packet passes through the 7 saveOrRetrieveMsg (i) tables sequentially, if its agg_metadata.cnt value is i, then its payload (the msg header) will be stored in the pool[i] buffer slot when it passes the saveOrRetrieveMsg(i) table, i=1, 2, ..., 7 (step S007, S009). In addition, agg_metadata.saved is set to 1 to indicate that this IoT packet has been stored in the buffer pool (step S007, S009). With this flag set, later the IoT packet will be discarded (step S008) without being forwarded. Note that when the packet passes through all other saveOrRetrieveMsg(i) tables whose index i is different from the value of its agg_metadata.cnt, no operation will be performed upon it. When the agg_metadata.cnt value is 0 (i.e., it overflows to restart from 0), it means that the current packet is the N'th packet for the N-packet aggregation process (N=8 in this example). In this case, when the packet passes through the 7 saveOrRetrieveMsg(i) tables sequentially, the payload stored in pool[i] will be retrieved and put into the msg(i) of the N-packet (step S010, S011) when the packet passes the i'th saveOrRetrieveMsg tables. Finally, the N'th packet is moved to the msg8 of the N-packet to form a complete N-packet for N=8. The agg_metadata.saved is set to 0 (step S012) and the IP header and the UDP header are modified (step S013). Then, the formed N-packet is sent to the routing process to route it to the next hop.

Step S003 checks if the incoming packet is a valid IP packet and the agg_metadata.saved is 0. If so, the packet being processed is not stored in the pool buffer and the normal routing process should be executed (step S004). Then, the packet should go through the Traffic Machine (TM) (step S005), egress pipeline (step S014), and deparser (step S015). After the above procedures, the aggregated packet is output by the P4 switch.

The following paragraphs will describe the process of the high-speed data-plane packet disaggregation method for transmitting data packets by using a Programming Protocol-Independent Packet Processor (P4) switch.

FIG. 6 is a flow chart of the high-speed data-plane packet disaggregation method in accordance with the present disclosure. As shown in the figure, the method includes the following steps (S11-S16).

Step S11: Receiving a plurality of packets by the P4 switch. Please refer to FIG. 1 again, the plurality of message packets are transmitted from the IoT devices to the first P4 switch 100. The packet aggregation process is conducted to form the aggregated packet pA as described in the previous embodiment. When the aggregated packet pA transfers through the WAN, the second P4 switch 200 receives the aggregated packet pA and conducts the packet disaggregation to turn the aggregated packet pA back to the original message packet. The second P4 switch 200 is similar to the first P4 switch 100. The plurality of aggregated packets are sent to the input port 30 of the P4 switch 300 and then transmitted to a parser 31 of the P4 switch 300 as mentioned in FIG. 4.

Step S12: Parsing each of the plurality of packets by using a parse graph defined in a switch configuration of the P4 switch. The parse graph 41 can be loaded to the switch configuration 40 of the P4 switch 300. The parse graph 41 defines the Ethernet header, the IP header, the UDP header, the flag header, the message header and the aggregated header of the packet. As shown in FIG. 2, the flag header indicates the types of the different packets to determine whether the packet is a message packet or an aggregated packet. If the packet is a message packet, its message header represents the data payload of the message packet. On the other hand, if the packet is an aggregated packet, its aggregated header represents the data payload of the packet. In the present embodiment, the parser 31 may parse the aggregated packets into different headers by using the parse graph 41. The parsed aggregated header has aggregated several message headers to reduce the waste of transmitting the same IP header and the UDP header over multiple message packets. As mentioned above, the P4 switch 300 is able to operate the different headers. Thus, the aggregated header parsed by the parser 31 may conduct the following process of packet disaggregation. Based on the parsing result, Ethernet header, the IP header and the UDP header can be operated to decide the output information, and the aggregated header can be operated to represent the original multiple message headers.

Step S13: Checking the flag header of the plurality of packets to determine whether the plurality of packets are aggregated packets by using a match-action table defined in the switch configuration of the P4 switch. In this step, the flag header will be checked to verify the type of the packet. The different types of packets may have different type numbers, which are loaded into the ingress pipeline 32. The match-action table configuration 43 defines a plurality of match fields and a plurality of control actions corresponding to the plurality of match fields for conducting the control program 42 at the ingress pipeline 32 of the P4 switch 300. When the packet is determined as the aggregated packet, the control program takes place in the hardware pipeline of the P4 switch 300. In other words, the aggregated packet does not need to reach the control plane to be analyzed by the software run by the switch CPU. Based on this situation, the performances of the packet disaggregation can be improved dozens of times.

Step S14: Cloning the aggregated packet and saving the cloned packet in the memory space of the P4 switch by using a match-action table. In order to disaggregate the cloned aggregated packet to the preset number of original message packets, the present embodiment uses the clone techniques to duplicate the aggregated packet to meet the preset number. The aggregated header of the cloned packets are sequentially divided into the original message headers, so that the corresponding message packet can be generated and saved in the memory space of the P4 switch 300. The clone process and the select process are conducted by using the ingress pipeline 32. The detailed process rules of the disaggregation will be discussed in the following embodiments.

Step S15: Modifying the aggregated header of the cloned packet to generate an original message header and modifying the IP header and the UDP header to generate an original message packet at an egress pipeline of the P4 switch by using the match-action table. Similar to the aggregation process, each of the original message packets may have their own message header, which is smaller in size than the cloned packet. Thus, the IP header and the UDP header used in the cloned aggregated packet need to make the appropriate changes. That is, the packet length and the checksum in the IP header and the UDP header should be modified to form a valid message packet for transmitting.

Step S16: Transmitting the original message packet to a deparser of the P4 switch and outputting the original message packet by the P4 switch. When the original message packets are generated, the packets will pass through the deparser 35 of the P4 switch 300 and output from the output port 36 of the P4 switch 300. The original message packets are transmitted to the IoT servers or the cloud database and the information of each message packet will be saved for deeper analysis.

Figure 7A:
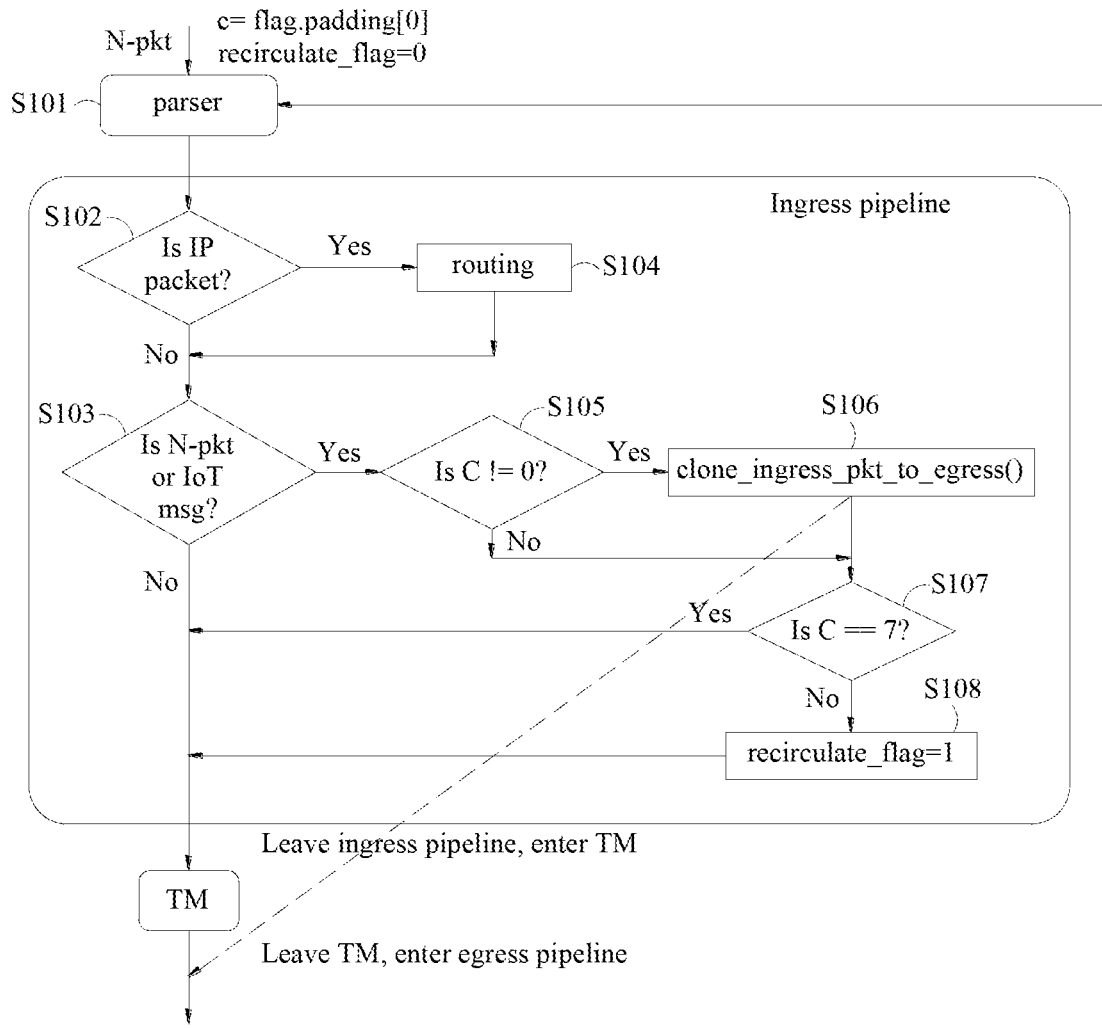
FIGS. 7A to 7B are flow charts of a recirculate and clone-based packet disaggregation method in accordance with the present disclosure.
Figure 7B:
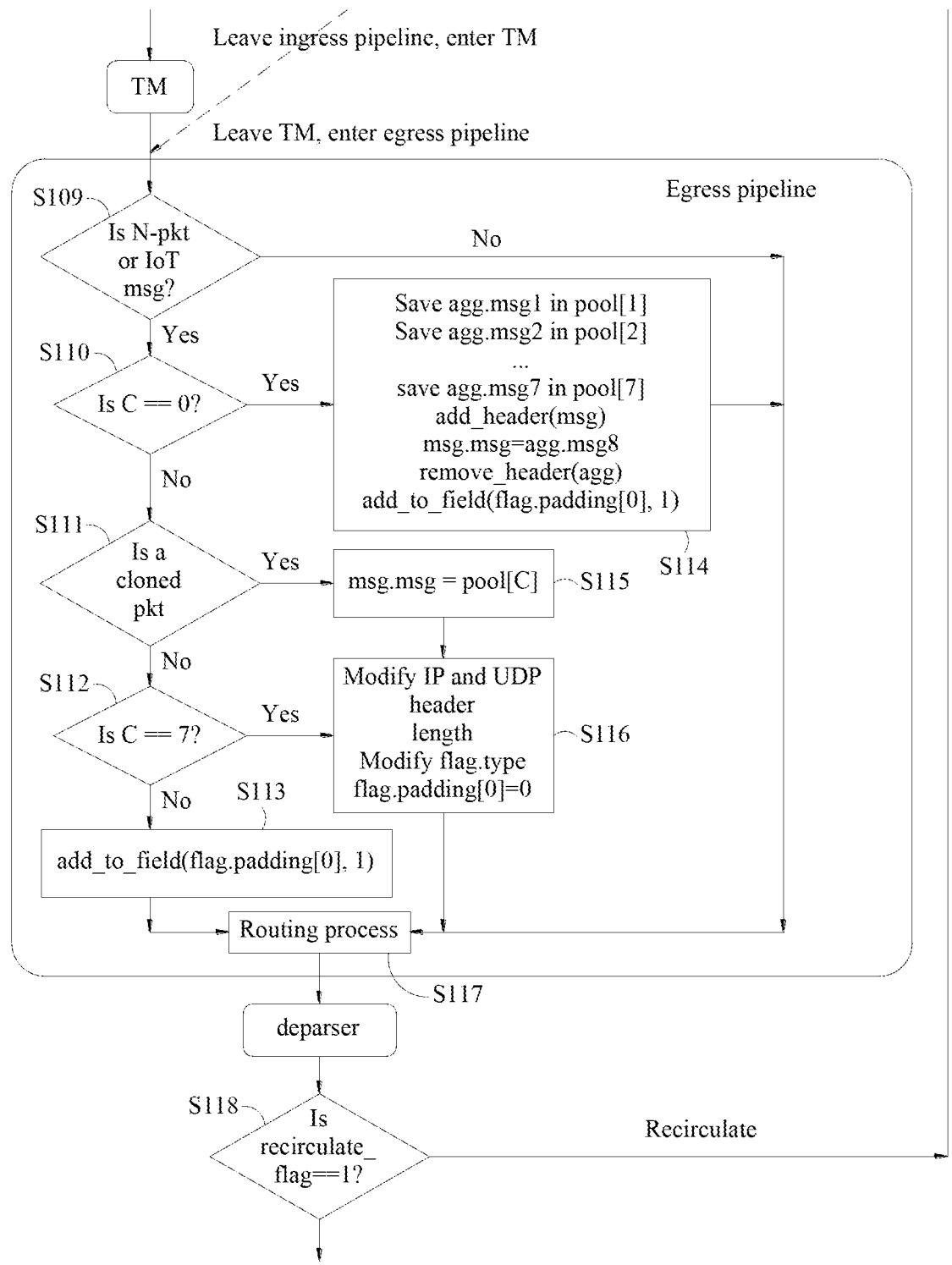
Figure 8:
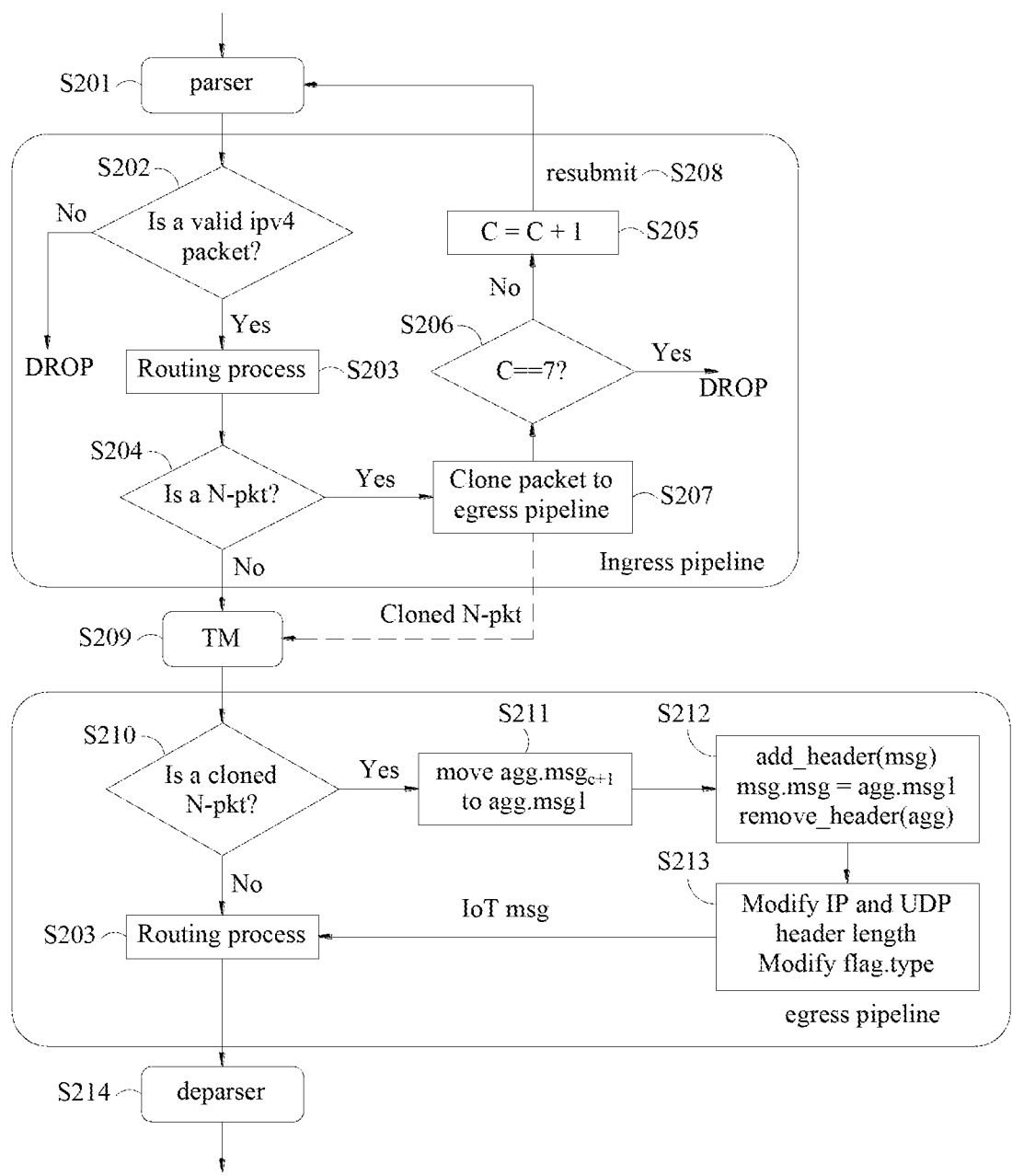
FIG. 8 is a flow chart of a resubmit and clone-based packet disaggregation method in accordance with the present disclosure.

Please also refer to FIGS. 7A to 7B, which are the flow charts of the recirculate and clone-based packet disaggregation method in accordance with the present disclosure. This flow chart is an example illustrating how to disaggregate an aggregated packet into eight message packets. As shown in the figures, the flow chart includes several steps (S101-S118) of the recirculate and clone-based process for disaggregating the aggregated packet. The present embodiment also disaggregates the aggregated packet which contains eight message packets in the aggregated header. However, the aggregated number of the aggregated packet is not limited by eight of the present embodiment and may change according to the setting of aggregated process.

As shown in the figures, the present embodiment uses the flag.padding[0] in the flag header of the N-packet (i.e., the aggregated packet shown in FIG. 2) to carry the number of recirculation that have been done for a N-packet back to the ingress pipeline. When the N-packet arrives at a P4 switch the first time, the value in its flag.padding[0] is zero. The value in its flag.padding[0] will be incremented by one each time when the packet is recirculated back to the ingress pipeline (i.e., by the add to field(flag.padding[0], 1) instruction in step S114). When an N-packet enters the P4 switch or when it is recirculated back to the ingress pipeline, this value will be retrieved and stored in the C variable for later processing in the ingress and egress pipelines (step S101). The step S102 checks whether the packet is a valid IP packet, if yes, then it is sent to the routing process (step S104); if not, sent to the step S103 to check whether the packet is the aggregated packet. The step S105 checks the value of C. When C is 0, which indicates that the N-packet enters the P4 switch the first time, the packet need not be cloned but needs to have its recirculate flag set to 1 and then it enters the egress pipeline (step S109, S110). Because currently C=0, step S114 will be executed and the msg(i) of the N-packet is stored into pool[i], i=1, 2, . . . , 7. Then these seven stored msg's are removed from the N-packet by the remove_header(agg) instruction and the last msg8 is stored in the msg field of the added msg header (by the add_header (msg) instruction). Then, the reduced-sized N-packet, which now has only a message header rather than the original aggregated header, is recirculated back to the ingress pipeline.

When the recirculated N-packet enters the ingress pipeline and C=1, 2, 3, 4, . . . , 7, the reduce-sized N-packet needs to be cloned and the cloned copy will enter the egress pipeline (step S106). In addition, the N-packet itself will enter the egress pipeline as well. In the egress pipeline, depending on the current value of C (step S110), the cloned reduce-sized N-packet will fetch the IoT packet stored in pool[C] (step S114) and store it in its msg.msg field (step S115). Then, this cloned packet, after modifying its length in the IP and UDP headers as done in S116, will go to S117 and be forwarded out of the P4 switch. Because C will increase from 1, 2, 3, . . . , to 7, this means that the seven cloned packets will sequentially carry msg1, msg2, msg3, msg4, msg5, msg6 and msg7 of the original N-packet out of the P4 switch, thus achieving the goal of disaggregating an N-packet into its composing IoT packets.

When the recirculated N-packet enters the ingress pipeline and C=1, 2, 3, 4, . . . , 6, the packet needs to be recirculated again and thus the recirculate-flag is set to 1 in step S108. When C=7 (step S107), the reduced-sized N-packet need not be recirculated again. Because its msg.msg field already contains the last IoT packet (i.e., msg8), which was stored there when C was 0 by the msg.msg=agg.msg8 instruction in step S114, in the egress pipeline we just need to update the length fields of its IP and UDP headers and reset its flag.padding[0] to the initial value 0 (step S116) and then forward it out of the P4 switch.

By this design, all the IoT packets aggregated in an N-packet (i.e., msg1, msg2, msg3, msg4, msg5, msg6, msg7, and msg8) can be disaggregated and sent out individually in the correct order. Besides, the amount of bytes that need to be cloned or recirculated to the ingress pipeline can be greatly reduced.

Please also refer to FIG. 8, which is the flow chart of resubmit and clone-based packet disaggregation method in accordance with the present disclosure. This method can also disaggregate an aggregated packet like the method presented in FIGS. 7A to 7B. However, it is slightly less efficient than the method presented in FIGS. 7A to 7B. As shown in the figure, the flow chart includes several steps (S201-S214) of the resubmit and clone-based process for disaggregating the aggregated packet. The present embodiment shown in FIG. 8 provides another method to disaggregate the aggregated packet which contains eight message packets in the aggregated header. The aggregated number of the aggregated packet is not limited by eight of the present embodiment and may change according to the setting of the aggregated process.

In this method, at the end of the ingress pipeline, the N-packet is submitted back to the parser for N times, and each time the N-packet is cloned and the cloned N-packet is sent to the egress pipeline to extract a different IoT packet from it. Then, the extracted IoT packet is sent to the specified output port for forwarding. The present embodiment sequentially extracts the IoT packet stored in the msg(i) of the N-packet, i=1, 2, . . . , 8, and forms it as a complete packet for independent forwarding. On the used P4 switch, the clone operation can only be used once for a packet being processed in the ingress pipeline. The clone operation cannot be executed N times while the packet is in the ingress pipeline. This is the reason why the method has to resubmit the packet back to the parser for N times and in each time only one cloned copy of the packet is made.

Like the packet aggregation method, the "cnt" metadata field is used to record how many times an N-packet has been resubmitted to the parser and it is represented as the "C" variable. For each N-packet entering the ingress pipeline the first time, the initial value for this "cnt" field is 0 and its value will be incremented by 1 (step S205) before it is resubmitted (step S208). When a packet is resubmitted to the parser, the current "cnt" metadata value can be carried to the parser for continuous uses. After the clone operation, if the value of this field has reaches N−1, it means that this packet has been cloned for N times and thus the packet should be dropped (step S206). In our example because N is 8, the "cnt" field will be incremented only up to 7.

The cloned N-packet will enter the TM (step S209) and then the egress pipeline. In the egress pipeline, the packet is first checked if it's a cloned packet (step S210).

A P4 switch uses the "standard_metadata.intance_type" field to indicate whether a packet is a cloned copy. If its value is not zero for a packet, then the packet is a cloned copy. Such a test is used to perform different actions on the packets passing through the egress pipeline. Only cloned N-packets need to go through the moveSpecificMsgToMsg1 and the formIoTMsg tables for further processing. As for non-N-packets, they will not go through these tables and instead will be forwarded out based on the normal routing process (step S203).

The following shows the moveSpecificMsgToMsg1 table designs, including the match field and the possible actions that can be applied to a passing N-packet.

```
table moveSpecificMsgToMsg1{
    reads{
        disagg_metadata.cnt: exact;
    }
    actions{
        no_op;
        _drop;
        move_msg2;
        move_msg3;
        move_msg4;
        move_msg5;
        move_msg6;
        move_msg7;
        move_msg8;
    }
    size: 12;
}
```

In this table, we use the "cnt" field in the disagg_metadata metadata as a match field to decide which message inside the aggregated header of the N-packet should be moved to agg.msg1 (step S211). The value of disagg_metadata.cnt ranges from 0 to 7 and is passed here from the "C" value in the ingress pipeline when the clone operation occurs. The purpose is to move msg(C+1) to msg1 (i.e., to overwrite msg1 with msg(C+1)) so that the to-be-extracted IoT packet is always stored in the beginning of the aggregated header. This will facilitate the actions performed in the formIoTMsg table.

When the C value is 0, the action "no_op," which stands for "No Operation" is executed and nothing is done to the packet because we want to extract msg1 and msg1 is already at the beginning of the aggregated header. For C=1, 2, ..., 7, we should execute the action "move_msg(C+1)" to move the msg(C+1) to the location of the first message in the aggregated header (i.e., agg.msg1). For example, when C is 1, the action move_msg2( ) defined as below should be executed, which moves msg2 to msg1 in the aggregated header.

To achieve the above design goals, several flow rules should be pre-installed into this table. Because the flow entry of this table has the format of (match field value, associated action), the rules pre-installed to this table are as follows: (0, no_op), (1, move_msg2), (2, move_msg3), (3, move_msg4), ..., (7, move_msg8).

The other table used in the disaggregation process is formIoTMsg. Because the method wants all passing N-packets to receive the same processing in this table, this table has no matching field and we only need to pre-install one rule here. The action associated with this rule is the extract_msg_and_update_header action defined by us. In this action, the message header is first added to the N-packet being processed. Then, the msg1 in the aggregated header (i.e., the IoT packet extracted from the moveSpecificMsgToMsg1 table) is copied to the message field of the added message header. Finally, the aggregated header of the N-packet is removed (step S212).

With the above operations, now the cloned N-packet has been transformed to a complete IoT packet. Now the length in the UDP header of this packet is set to 30, which is 8 (UDP header)+6 (flag header)+16 (IoT packet payload). The length in the IP header of the IoT packet is set to 50, which is 30+20 (IP header). After these fields are updated, the checksum field of the UDP header is recalculated. Finally, the type of the flag header of this packet is modified to indicate that this packet is an IoT packet (step S213) and the disaggregation process is finished here. This complete IoT packet then is sent to the routing process for normal routing.

Beyond the resubmit and clone-based method and the recirculate and clone-based method, another multicast-based method is also provided here. In this method, in the ingress pipeline an N-packet will pass through a table named "setMulticast,". This action sets the multicast group to a specific value for the packets. Note that the intrinsic_metadata is a special metadata provided by the P4 switch. It contains the necessary metadata for the users to enable some functions of the P4 switch. In this case, the intrinsic_metadata.mcast_grp needs to be set to let the switch know that the packet should be multicast through a certain multicast group.

After being processed by the setMulticast table, the packet leaves the ingress pipeline and enters the TM. In the TM, the multicast group number (i.e., intrinsic_metadata.mcast_grp) is checked and the packet is multicast to multiple ports according to the multicast group settings associated with this number. Normally, for the multicast application, a packet will be multicast to different output ports. However, in our packet disaggregation design, we configure the multicast group so that all multicast copies of the N-packet go to the same output port where they should be forwarded out. Note that this multicast group configuration needs to be done before the packet disaggregation process begins.

With these settings, when an N-packet passes through the TM, the P4 switch will generate 8 copies of it (in our example, N=8) and send them to the same output port. When these packets enter the egress pipeline, they will be modified to be the 8 different IoT packets that we want to extract from the N-packet. Like what is performed in the resubmit and clone-based disaggregation method, we need to identify each multicast copy of the N-packet and decide which msg(i), i=1, 2, ..., 8 should be extracted from its aggregated header.

This design goal is achieved by using the intrinsic_metadata.egress_rid metadata. This metadata is automatically set in the TM to help identify each copy of the multicast packet. In the present embodiment, eight multicast copies of the N-packet are generated, and the intrinsic_metadata.egress_rid carried in these copies will range from 0 to 7. Similar to the previous disaggregation method, in the moveSpecificMsgToMsg1 table, the no_op action is executed when intrinsic_metadata.egress_rid is 0. Let C be intrinsic_metadata.egress_rid. For C=1, 2, 3, 4, 5, 6 and 7, the move_msg(C+1) action is executed to move the specified msg(C+1) from its original place to the beginning of the aggregated header (msg1). Then, these packets will enter the formIoTMsg table and the msg1 in their aggregated headers will be extracted to form complete and different IoT packets. Because the multicast-based disaggregation method is similar to the resubmit and clone-based disaggregation method and the difference is only in whether we use the clone operation or the multicast operation to make N copies of the N-packet, the flow chart of the multicast-based disaggregation method is not provided in this document.

Based on the above packet aggregation and disaggregation methods, the packet aggregation algorithm and the packet disaggregation algorithms have been implemented in an EdgeCore P4 switch that uses the Barefoot wedge 100BF-65X Tofino chip as its switching ASIC. This Tofino chip provides 6.5 Tbps front panel bandwidth divided into 64 100-Gbps QSFP28 ports. The 100 Gbps load composed of small IoT packets are generated and pumped into an EdgeCore P4 switch through the 100-Gbps FX3-100GQ-T2 line card of the used hardware packet generator and performance measurement equipment called the "TestCenter".

The packet counters of TestCenter were used to investigate the maximum aggregation throughput of our aggregation method without incurring any packet loss in the P4 switch. With the packet count information, a binary search benchmarking method is used to find the maximum load such that no IoT packets or N-packets was lost inside the P4 switch due to packet aggregation.

The input parameters of our experiments are the number N of IoT packets to be aggregated and the payload size S of an IoT packet, where N=1, 2, 4, and 8, and S=22, 26, 34, 42, and 46 bytes, respectively. Table 1 shows the maximum throughputs of our packet aggregation method for various combinations of N and S without incurring any packet loss. In the table, if no number is shown for a specific combination of parameters, it means that the P4 compiler could not successfully compile the P4 code for that combination.

The table indicates that except for two cases, the maximum aggregation throughputs of our aggregation method can achieve 100 Gbps; i.e., the line rate of the P4 switch. The two exception cases occur when N=2 and S=42 and 46, respectively. Under those conditions, the maximum throughputs drop a bit to 95 Gbps and 98 Gbps, respectively. Such throughput degradation is due to the internal designs of the Tofino chip. To conclude, when the used total buffer space can be accommodated by the Tofino chip, the aggregation P4 code can be compiled and it performs at the 100 Gbps line rate of the P4 switch.

As for the time required to aggregate N IoT packets, it was so tiny that TestCenter could not measure it precisely. As shown in this table, because the aggregation was performed at the 100 Gbps line rate, the time required to aggregate N IoT packets each with an S-byte payload can be calculated as about N*S*8 (bits)/100 Gbps. Based on this formula, when N=8 and S=22, the required time is only 14 nanoseconds, which is very tiny.

TABLE 1

| S | N | | | |
| --- | --- | --- | --- | --- |
| | 1 | 2 | 4 | 8 |
| 22 bytes | 100 Gbps | 100 Gbps | 100 Gbps | 100 Gbps |
| 26 bytes | 100 Gbps | 100 Gbps | 100 Gbps | |
| 34 bytes | 100 Gbps | 100 Gbps | 100 Gbps | |
| 42 bytes | 100 Gbps | 95 Gbps | | |
| 46 bytes | 100 Gbps | 98 Gbps | | |

Table 2 shows the maximum throughputs of the recirculate and clone-based packet disaggregation method and the ratios of these values to the maximum theoretic throughputs that can be achieved by any packet disaggregation method when the line rate of the switch is 100 Gbps. After the disaggregation process, because the total number of bytes of the generated IoT packets will be much greater than the number of bytes of the aggregated N-packet, the input rate of the N-packets cannot be the line rate of the P4 switch; otherwise the generated IoT packets will be dropped by the output port of the P4 switch due to insufficient port bandwidth. To avoid this phenomenon, the input rate of the N-packets needs to be reduced from the line rate to a much smaller rate until this problem disappears. This reduced rate depends on the combination of the values of N and S and is the maximum theoretic throughput of the disaggregation method. In this table, this method provides the best performance and it can achieve 100% of the maximum theoretic throughputs in all cases. The performance improvements are achieved by reducing the amount of bytes that need to be cloned or recirculated back to the ingress pipeline.

TABLE 2

| S | N | | | |
| --- | --- | --- | --- | --- |
| | 1 | 2 | 4 | 8 |
| 22 bytes | 100 Gbps (100%) | 59 Gbps (100%) | 38 Gbps (100%) | 28 Gbps (100%) |
| 26 bytes | 100 Gbps (100%) | 61 Gbps (100%) | 41 Gbps (100%) | 32 Gbps (100%) |
| 34 bytes | 100 Gbps (100%) | 64 Gbps (100%) | 46 Gbps (100%) | |
| 42 bytes | 100 Gbps (100%) | 67 Gbps (100%) | 50 Gbps (100%) | |
| 46 bytes | 100 Gbps (100%) | 68 Gbps (100%) | 51 Gbps (100%) | |

While the means of specific embodiments in present disclosure has been described by reference drawings, numerous modifications and variations could be made thereto by those skilled in the art without departing from the scope and spirit of the disclosure set forth in the claims. The modifications and variations should be in a range limited by the specification of the present disclosure.

What is claimed is:

1. A high-speed data-plane packet aggregation method for transmitting data packets by using a Programming Protocol-Independent Packet Processor (P4) switch, the packet aggregation method comprising following steps of:
   receiving a plurality of packets by the P4 switch, the plurality of packets being transmitted to a parser of the P4 switch;
   parsing an Ethernet header, an IP header, a UDP header, a flag header and a message header of each of the plurality of packets by using a parse graph defined in a switch configuration of the P4 switch, the flag header indicating types of the plurality of packets and the message header representing data payload of the plurality of packets;
   checking the flag header of the plurality of packets to determine whether the plurality of packets are message packets by using a match-action table defined in the switch configuration of the P4 switch, the match-action table defines a plurality of match fields and a plurality of control actions corresponding to the plurality of match fields for conducting a control program at an ingress pipeline of the P4 switch;
   saving the message headers of the message packets in a memory space of the P4 switch by using a match-action table;
   aggregating a preset number of message headers as an aggregated header and modifying the IP header and the UDP header to generate an aggregated packet at an egress pipeline of the P4 switch by using the match-action table; and
   transmitting the aggregated packet to a deparser of the P4 switch and outputting the aggregated packet by the P4 switch.

2. The high-speed data-plane packet aggregation method of claim 1, wherein the message packets comprise sensing data collected by an IoT device.

3. The high-speed data-plane packet aggregation method of claim 1, wherein the control actions of the match-action table comprise get counter for counting numbers of the message packets received so far for generating the aggregated packet.

4. The high-speed data-plane packet aggregation method of claim 1, wherein the control actions of the match-action table comprise save message for saving the message header in a message pool.

5. The high-speed data-plane packet aggregation method of claim 1, wherein the control actions of the match-action table comprise move message for combining saved message headers to the aggregated header and update length for modifying checksums of the IP header and the UDP header.

6. A high-speed data-plane packet disaggregation method for transmitting data packets by using a Programming Protocol-Independent Packet Processor (P4) switch, the packet disaggregation method comprising following steps of:
- receiving a plurality of packets by the P4 switch, the plurality of packets being transmitted to a parser of the P4 switch;
- parsing an Ethernet header, an IP header, a UDP header, a flag header and an aggregated header of each of the plurality of packets by using a parse graph defined in a switch configuration of the P4 switch, the flag header indicating types of the plurality of packets and the aggregated header representing data payload of the plurality of packets;
- checking the flag header of the plurality of packets to determine whether the plurality of packets are aggregated packets by using a match-action table defined in the switch configuration of the P4 switch, the match-action table defines a plurality of match fields and a plurality of control actions corresponding to the plurality of match fields for conducting a control program at an ingress pipeline of the P4 switch;
- cloning the aggregated packet and saving a cloned packet in a memory space of the P4 switch by using a match-action table;
- modifying the aggregated header of the cloned packet to generate an original message header and modifying the IP header and the UDP header of the cloned packet to generate an original message packet at an egress pipeline of the P4 switch by using the match-action table; and
- transmitting the original message packet to a deparser of the P4 switch and outputting the original message packet by the P4 switch.

7. The high-speed data-plane packet disaggregation method of claim 6, wherein the original message packet is output from the P4 switch and transmitted to an IoT server.

8. The high-speed data-plane packet disaggregation method of claim 6, further comprising the following step of:
- sending the cloned packet to the egress pipeline and saving message headers divided in the aggregated header of the cloned packet in the egress pipeline according to a preset number;
- adding a new message header to the cloned packet and removing the aggregated header to generate the original message packet; and
- setting a recirculate flag to indicate that the aggregated packet needs to be recirculated back to the parser to perform another cloning process until a number of a clone operation equals the preset number.

9. The high-speed data-plane packet disaggregation method of claim 6, further comprising the following step of:
- sending the cloned packet to the egress pipeline;
- adding a new message header and moving a divided message header in the aggregated header of the cloned packet to the new message header as the original message header and removing the aggregated header of the cloned packet to generate the original message packet; and
- setting a counter to represent a number of a clone operation applied to the aggregated packet and resubmit the aggregated packet back to the parser to perform another cloning process until the number equals a preset disaggregated number.

10. The high-speed data-plane packet disaggregation method of claim 6, wherein the control actions of the match-action table comprise set multicast for generating a preset number of copies of the aggregated packet and defining same output port for the preset number of copies.

* * * * *